United States Patent
Samadi et al.

(10) Patent No.: US 7,286,560 B2
(45) Date of Patent: Oct. 23, 2007

(54) METHODS AND APPARATUS FOR OPTIMUM PACKET AGGREGATION IN A COMMUNICATION NETWORK

(75) Inventors: Behrokh Samadi, Saratoga, CA (US); Qinqing Zhang, Morganville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1048 days.

(21) Appl. No.: 10/304,600

(22) Filed: Nov. 26, 2002

(65) Prior Publication Data
US 2004/0100991 A1 May 27, 2004

(51) Int. Cl.
*H04J 3/16* (2006.01)
*H04J 3/22* (2006.01)

(52) U.S. Cl. ............... 370/466; 370/469; 370/471; 370/473; 370/477

(58) Field of Classification Search .......... 370/469, 370/470, 471, 473, 474, 477, 356, 466, 401, 370/463, 310, 328
See application file for complete search history.

(56) References Cited

U.S. PATENT DOCUMENTS

| | | | | |
|---|---|---|---|---|
| 6,356,545 B1 * | 3/2002 | Vargo et al. | ............. | 370/355 |
| 6,888,848 B2 * | 5/2005 | Beshai et al. | ............. | 370/474 |
| 6,920,125 B1 * | 7/2005 | Wu | ............. | 370/338 |
| 7,002,993 B1 * | 2/2006 | Mohaban et al. | ............. | 370/471 |
| 2003/0035413 A1 * | 2/2003 | Herle et al. | ............. | 370/352 |
| 2004/0125747 A1 * | 7/2004 | Samadi et al. | ............. | 370/230 |
| 2005/0105469 A1 * | 5/2005 | Hao | ............. | 370/235 |
| 2006/0109829 A1 * | 5/2006 | O'Neill | ............. | 370/338 |
| 2006/0209796 A1 * | 9/2006 | Scott | ............. | 370/352 |

* cited by examiner

*Primary Examiner*—Min Jung
(74) *Attorney, Agent, or Firm*—Matthew J. Hodulik

(57) ABSTRACT

The present invention is a method and apparatus to aggregate or bundle packets to optimize the resource utilization and improve the transport efficiency of packets which are transferred between various protocol layers in a communications network. One embodiment of the invention sets forth a method of aggregating packets of a first size to packets of a second size for transmission in a wireless communications network between, for example, a base station controller and base transmitting station. The method includes the steps of calculating a maximum bundling factor represented by (an IP packet MTU size at a first location minus protocol overhead) divided by an application layer packet size and determining a most efficient bundling factor in terms of packet fragments, where the most efficient bundling factor is determined by a largest packet per fragment ratio. If the number of packets to be bundled is less than or equal to the maximum bundling factor then all packets are bundled together for a next step in the transmission. If the number of packets to be bundled is greater than the maximum bundling factor, then packets are bundled according to the most efficient bundling factor for the next step in the transmission. If there are multiple bundling factors having a same bundling efficiency, a larger of the multiple bundling factors having the same bundling efficiency is selected as the most efficient bundling factor.

22 Claims, 4 Drawing Sheets

Optimum packets aggregation procedure

Figure 1 Radio Access Network Reference Architecture

Figure 2 Protocol Stack in the Reference Radio Access Network

Figure 3 Optimum packets aggregation procedure

| b: | 1 | 2 | 3 | 4 | 5 | 6 | 7 | 8 | 9 | 10 | 11 |
|---|---|---|---|---|---|---|---|---|---|---|---|
| m: | 1 | 1 | 1 | 2 | 2 | 2 | 3 | 3 | 3 | 3 | 4 |

FIG. 4

METHODS AND APPARATUS FOR OPTIMUM PACKET AGGREGATION IN A COMMUNICATION NETWORK

FIELD OF THE INVENTION

The present invention relates generally to packet communications networks and more particularly to packet aggregation and/or multiplexing techniques within such networks.

BACKGROUND OF THE INVENTION

Referring to FIG. 1, an exemplary network 100 including multiple nodes is shown. The exemplary network 100 may be, for example, a radio access network for high speed wireless data applications. Typical radio access networks, like that shown in FIG. 1 include one or more Access Terminals 102 (AT), Base Stations 104 (BTS), and Base Station Controllers 106 (BSC). A PDSN 108 interfaces between the IP network and the radio access network. The BSC 106 receives data from the core network 110 and passes the data to the BTS 104 so that the BTS can transmit the data to the AT 102 over the wireless link 120. Data is communicated through the reverse direction as well and passed from AT 102 to the core network 110. In general, each node consists of multiple functional components or units, where for example, each component is responsible for providing different functions or services. For example, at a Base Station, there may be a cell radio control unit, modem card unit and radio/amplifier unit to fulfill the overall function of a base station.

To further describe the information transmission between BSC and BTS, the protocol stacks 200 between the BSC and the BTS are shown in FIG. 2. As can be seen, there are multiple layers of protocols on each node to handle the peer-to-peer communications. As shown in FIG. 2, a Traffic Processor (TP) in the BSC receives packets from core networks via the Packet data service node (PDSN). The packets entering the BSC are IP packets encapsulated with GRE (Generic Routing Encapsulation) packets. The BSC processes the GRE packets and forms RLP (Radio Link Protocol) frames. RLP frames will be further passed to lower layers of RMI, UDP or TCP, and finally be formed into an IP packet that is sent over to the cell site.

Each layer of a protocol usually defines a Maximum Transmission Unit (MTU), which is the largest frame size that can be transmitted over the physical network. Messages longer than the MTU must be divided or fragmented into smaller frames. This operation is called fragmentation. The layer 3 protocol, which is IP in this example, extracts the MTU from the layer 2 protocol (e.g., Ethernet, etc.), fragments the messages into that frame size and makes them available to the lower layer for transmission.

In the illustrated radio access network scenario of FIGS. 1 and 2, the MTU size of the IP layer at the TP is 1500-bytes. The RLP frame size, however, is only 128-bytes. To improve the transport efficiency, i.e., to transport more data with the fixed protocol header, the RMI (Remote Method Innovation) protocol can aggregate or bundle the RLP frames together to form a large RMI message. The maximum bundling factor in this example is 11 so that the RMI message can be encapsulated in an IP packet fitting in the 1500-byte size after passing through the UDP or TCP layer.

Although larger size packets are generally preferred for better transport efficiency, there are implications on other network nodes and resources when always selecting larger size packets. In the radio access network example, the Cell Radio Control (CRC) unit at a BTS, which receives IP packets from the BSC is connected to the modem cards through a bus, which is generally a high-speed serial bus transporting data between multiple devices. The MTU size of the bus is only 460-bytes. When a 1500-byte IP packet arrives at the CRC, the IP layer at the CRC has to fragment the IP packet into IP fragments of 460-bytes before sending them to the bus. Fragmentation at the CRC requires extra processing power and increases the processor occupancy. Thus, it is not always preferable to choose the largest bundling factor at the BSC in the view of processing power. Accordingly, there is a need to improve packet aggregation, so as to better utilize processing resources.

SUMMARY OF THE INVENTION

The present invention is a method and apparatus to aggregate or bundle packets to optimize the resource utilization and improve the transport efficiency of packets which are transferred between various protocol layers in a communications network. One embodiment of the invention sets forth a method of aggregating packets of a first size to packets of a second size for transmission in a wireless communications network between, for example, a base station controller and base transmitting station. The method includes the steps of calculating a maximum bundling factor represented by (an IP packet MTU size at a first location minus protocol overhead) divided by an application layer packet size and determining a most efficient bundling factor in terms of packet fragments, where the most efficient bundling factor is determined by a largest packet per fragment ratio. If the number of packets to be bundled is less than or equal to the maximum bundling factor then all packets are bundled together for a next step in the transmission. If the number of packets to be bundled is greater than the maximum bundling factor, then packets are bundled according to the most efficient bundling factor for the next step in the transmission. If there are multiple bundling factors having a same bundling efficiency, a larger of the multiple bundling factors having the same bundling efficiency is selected as the most efficient bundling factor.

BRIEF DESCRIPTION OF THE DRAWINGS

A more complete understanding of the present invention may be obtained from consideration of the following detailed description of the invention in conjunction with the drawing, with like elements referenced with like references, in which:

FIG. 4 illustrates exemplary bundling factors for a specific example implementation of the present invention.

DETAILED DESCRIPTION

The present invention is a methodology for providing packet aggregation to achieve optimum trade-off between transport efficiency and processing power. Although an exemplary embodiment of the invention is described in connection with the transmission between a base station controller (BSC) and cell radio control unit (CRC) at a base station (BTS), and the CRC to the modem cards in BTS, and the interface/link between them, it would be apparent to those skilled in the art that the present invention is applicable to other network areas requiring packet aggregation, including, for example, voice over IP networks where small application layer packets (e.g., voice frames) need to be aggregated or multiplexed together to be transported over IP networks.

In accordance with the discussion of the present invention, it is assumed that application layer packets (e.g., the RLP frames) can be aggregated and encapsulated into an IP packet (executed via multiple layers in the example) at Node A (i.e., BSC). The IP packet is transmitted to Node B (i.e., CRC) and departs for another component.

The following notations are used throughout the application in describing the invention:

| | |
|---|---|
| F: | The application layer packet size in bytes, which is assumed to be fixed. |
| MTUa: | The IP MTU size at Node A. |
| OH: | Represents the protocol overhead in bytes, which includes the overhead added by other layers before the IP layer. |
| b: | Packet bundle factor:, where b = 1, 2, . . . , bmax, where bmax = $\lfloor$(MTUa-OH)/F$\rfloor$ |
| MTUb: | MTU size at Node B in bytes. |

Taking into account the above notations, the IP packet size departure from Node A is equal to b*F+OH. If the IP packet entering Node B is larger than MTUb, a packet will be fragmented into smaller sizes. The number of IP fragments m (at node B) is given by:

$$m = \left\lceil \frac{b*F + OH}{MTU_b} \right\rceil$$

It is assumed that the processor occupancy (the fraction of time the processor is busy, e.g., on time-critical tasks.) at Node B is proportional to the number of IP fragments per second. Thus, in order to reduce the processor occupancy, one needs to minimize the total number of IP fragments at the Node B.

If it is assumed that there are n application layer packets in the buffer (of node A) waiting for transmission, an objective of the present invention is to choose an appropriate bundling procedure such that the total number of IP fragments is kept to a minimum. In other words, a numerical representation of the problem would be as follows:

$$\text{find } K \text{ and } \{b_i\} \text{ with } n = \sum_{i=1}^{K} b_i, \; b_i \leq b_{\max}$$

$$\text{such that } T = \sum_{i=1}^{K} \left\lceil \frac{b_i * F + OH}{MTU_b} \right\rceil \text{ is minimum.}$$

K is the number of IP packets generated from the aggregation process at Node A, and T is the total number of IP fragments that depart from Node B.

Figure 3:
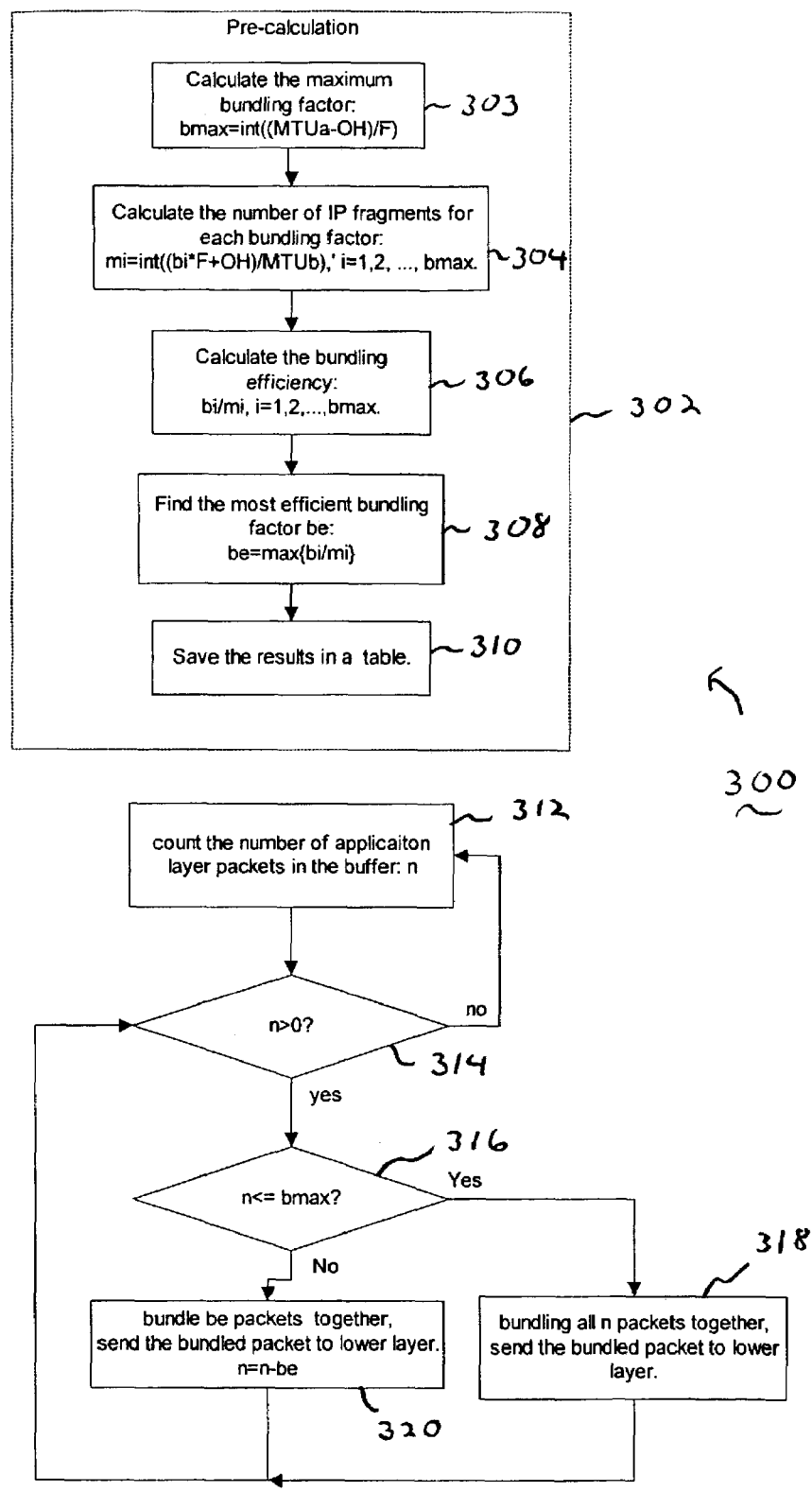
FIG. 3 is an exemplary flow diagram of the aggregation methodology according to the present invention.

Exemplary Algorithm:

Referring to FIG. 3, an exemplary methodology in accordance with the present invention is shown in flow chart form (300) for providing packet aggregation to achieve optimum trade-off between transport efficiency and processing power.

A first generalized step in accordance with the present invention is to perform a pre-calculation routine represented by box 302. The pre-calculation routine is comprised generally of finding a most efficient bundling factor, $b_e$, and storing the result in memory. The detailed calculation consists of calculating a maximum bundling factor (for aggregation at Node A), $b_{max}$ as shown in box 303. Next, the number of IP fragments, $m_i$, for a number of bundling factors, $b_i=1$, to $b_{max}$, is calculated (box 304). A bundling efficiency is calculated for each $b_i$ and $m_i$ in box 306. Next, in box 308, the most efficient bundling factor, $b_e$, is determined and that value is stored, for example in a table (box 310).

A next step (312) in the process, after the pre-calculation phase, is to count the number of application layer packets, n, in the appropriate buffer. At decision box 314, it is determined whether n>0. If not, the procedure returns to step 312. If yes, it is determined whether n is less than or equal to $b_{max}$ 316. If this is the case, then all n packets are bundled together and sent to the lower layer 318. On the other hand, if n is greater than $b_{max}$, then the be packets are bundled together and sent to the lower layer 320. Here n equals n–$b_e$. This process is repeated until the remaining number of packets is less than or equal to $b_{max}$. The remaining packets are then bundled together.

A short hand summary of one embodiment of the present invention is given below:

1. Calculate the maximum bundle size, bmax=$\lfloor$(MTUa–OH)/F$\rfloor$.
2. For each bundle size, calculate the number of IP fragments $m_i$, i=1,2, . . . . . , $b_{max}$.
3. Find the most efficient bundling regarding to the number of IP fragments, i.e., the largest number of packet per fragment: $b_e/m_e$=max $\{b_i/m_i\}$. If there are multiple bundle sizes with the same bundling efficiency, the largest $b_i$ among them will be used.
4. If n$\leq b_{max}$, bundle all n packets together, i.e, K=1, $b_1$=n.
5. If n>$b_{max}$, bundle $b_e$ packets first. Repeat until the remaining number of packets is less than or equal to $b_{max}$. Bundle the left packets altogether.

To further illustrate the aggregation methodology of the present invention, an example is presented assuming the following values for the parameters:

F=128-byte, MTUa=1500-byte, OH=47-byte, MTUb=460-byte

Utilizing the above calculations in step 1, it is determined that bmax=$\lfloor$(1500–47)/128$\rfloor$=11. The number of IP fragments for respective bundling factors is shown in FIG. 4.

Figure 4:
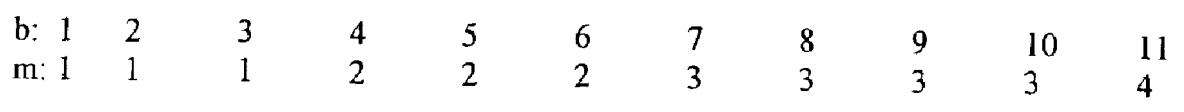

As can be seen from FIG. 4, even though $b_{max}$ is equal to 11, the most efficient bundling factor is 10 since b/m=(10/3) is the largest compared to others. Therefore, for the bundling process of the present invention, we choose bundle size of 10 instead of 11 to optimize the processing power at Node B.

Some of the advantages of the present invention packet aggregation method are that: Packet aggregation improves the transport efficiency by sending more data with less overhead. The algorithm also takes into consideration processing resources of other network component and thus it improves the utilization of CPU power at these other components. The present invention algorithm optimizes both transport efficiency and processing power, and thus achieves the best overall usage of network resources. The invention does not prevent using the maximum bundling factor at all.

In the situation where there are exact $b_{max}$ frames, it uses the maximum bundling factor instead of be for better transport efficiency.

As discussed, the present invention algorithm may not fully utilize the MTU size for packet transmission. However, it may not increase the overhead percentage considering the typical packet size distribution in the network. For example, in the example presented above, the method of the invention uses a bundling factor of 10 instead of 11, which increases the overhead percentage for that bundled packet. But in general, packets received from the core network often result in 12 RLP frames in the buffer. The algorithm generates two IP packets with 10 and 2 RLP frames. Comparing to the case of two IP packets with 11 and 1 RLP frames, the overhead percentages of the two different methods remain the same.

Figure 1:
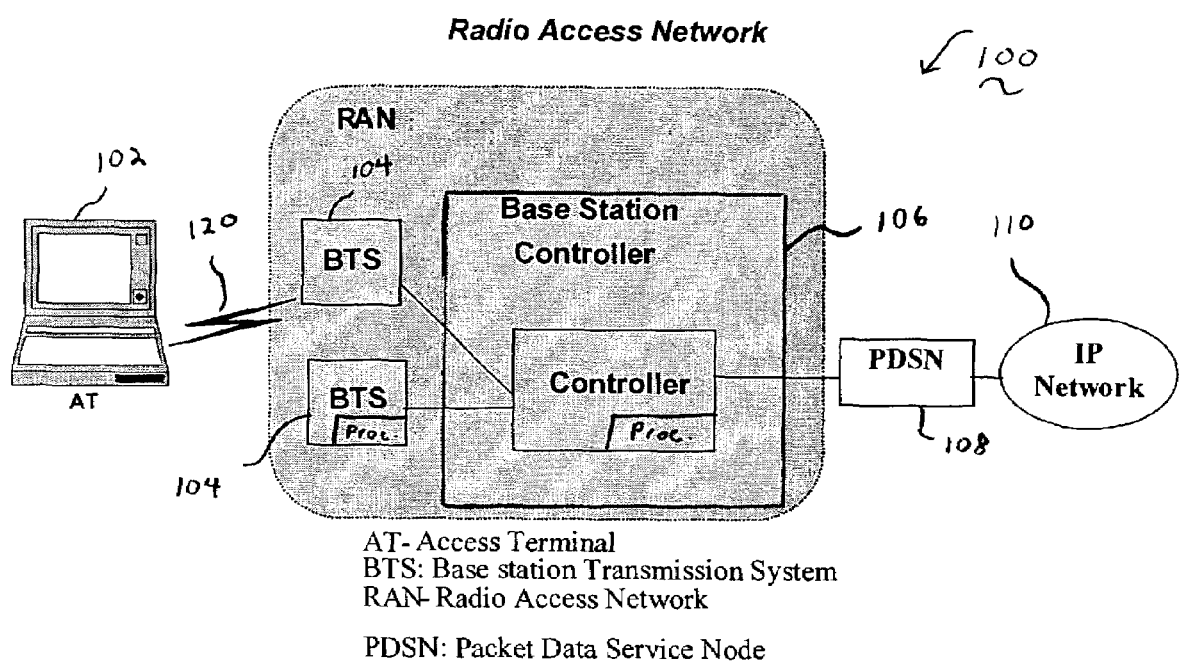
FIG. 1 is an exemplary embodiment of a radio access network.
Figure 2:
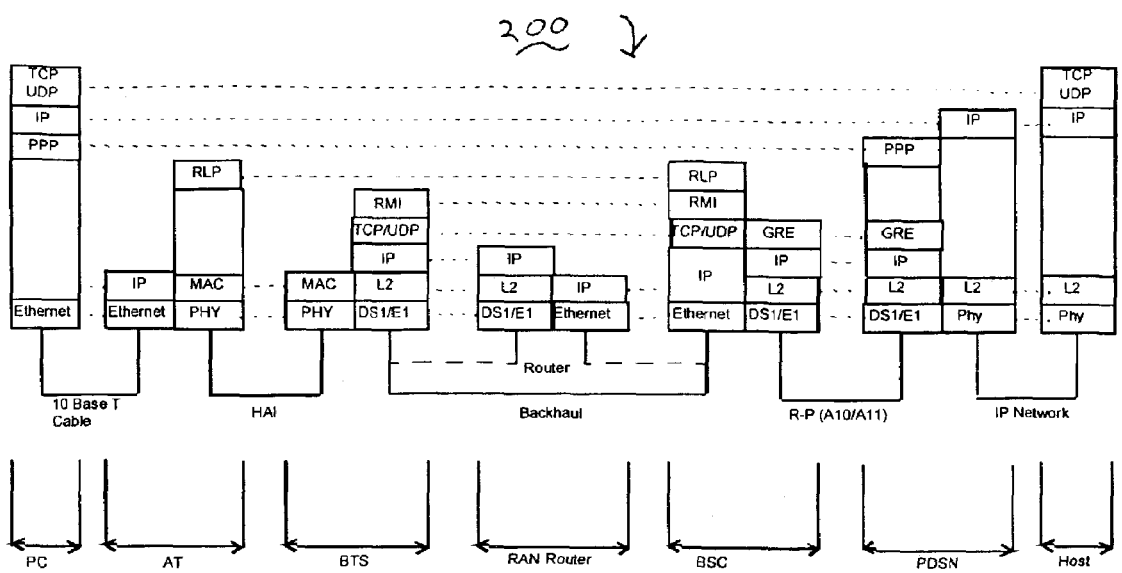
FIG. 2 is an exemplary representation of protocol stacks between a base station controller and base station transmitter.

As would be understood by persons skilled in the art, the present invention may be implemented in software, firmware, hardware or combinations thereof network nodes of a communications system. These nodes include suitable hardware, such as a processor and memory, along with appropriate circuit logic for implementation of the invention. It would also be understood that the present invention may be implemented in other types of equipment in a communications network that would call for functionality in accordance with the invention. For example, as shown in FIG. 1, the BTSs and BSC each include processors for implementation of the present invention.

Another application of the present invention is in a voice over packet communications, specifically voice over IP. In such applications, small voice segments are multiplexed (aggregated, bundled) into a larger packet for transport efficiency. Typically, the size of the larger packet is a global parameter and not optimized for every node on the network. The invention can be utilized to rebundle the packet to minimize the transport cost, while minimizing fragmentation for environments where the voice frames need to be transferred over a media with smaller packet sizes. Such an application would be, for example, if the voice gateway has internal packet size limitations.

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Many other modifications and applications of the principles of the invention will be apparent to those skilled in the art and are contemplated by the teachings herein. Accordingly, the scope of the invention is limited only by the claims appended hereto.

What is claimed is:

1. A method of aggregating packets of a first size to packets of a second size for transmission in a communications network, said method comprising the steps of:
    calculating a maximum bundling factor for aggregating said packets of said first size to packets of said second size;
    determining a most efficient bundling factor in terms of packet fragments, said most efficient bundling factor being determined by a largest packet per fragment ratio; and
    if a number of packets to be bundled is greater than the maximum bundling factor, then bundle packets according to the most efficient bundling factor for at least a next step in the transmission.

2. The method of claim 1, wherein if a number of packets to be bundled is less than or equal to the maximum bundling factor then bundle all packets together for a next step in the transmission.

3. The method of claim 1, further including the step of calculating a number of IP fragments for each bundling factor i through the maximum bundling factor.

4. The method of claim 1, further including the step of calculating a bundling efficiency for each bundling factor i through the maximum bundling factor.

5. The method of claim 1, wherein a larger of multiple bundling factors having a same bundling efficiency is selected as the most efficient bundling factor.

6. The method of claim 1, wherein said transmission is between a base station controller and a base station transmitter in a wireless network.

7. The method of claim 1, wherein said transmission is in a voice over IP network involving packet multiplexing.

8. The method of claim 1, wherein the maximum bundling factor bmax, is determined according to bmax=$\lfloor$(MTUa−OH)/F$\rfloor$, where MTUa is an IP packet MTU size at a first location, OH is protocol overhead and F is an application layer packet size.

9. The method of claim 1, wherein bundling according to the most efficient bundling factor continues until the number of packets to be bundled is less than the maximum bundling factor.

10. A method of aggregating packets of a first size to packets of a second size for transmission in a wireless communications network between a base station controller and base transmitting nation, said method comprising the stops of:
    calculating a maximum bundling factor represented by (an IP packet MTU size at a first location minus protocol overhead) divided by an application layer packet size;
    determining a most efficient bundling factor in terms of packet fragments, said most efficient bundling factor being determined by a largest packet per fragment ratio;
    if a number of packets to be bundled is less than or equal to the maximum bundling factor then bundle all packets together for a next step in the transmission; and if a number of packets to be bundled is greater than the maximum bundling factor, then bundle packets according to the most efficient bundling factor for the next step in the transmission.

11. The method of claim 10, further including the step of calculating a number of IP fragments for each bundling factor i through the maximum bundling factor.

12. The method of claim 11, further including the step of calculating a bundling efficiency for each bundling factor i through the maximum bundling factor.

13. The method of claim 12, wherein a larger of multiple bundling factors having a same bundling efficiency is selected as the most efficient bundling factor.

14. The method of claim 10, wherein said transmission is between a base station controller and a base station transmitter in a wireless network.

15. A apparatus for converting packets of a first size to packets of a second size for transmission in a communications network, said apparatus comprising:
   at least one input and at least one output for inputting and outputting packets, respectively; and
   a processor operable to calculate a maximum bundling factor for aggregating said packets of said first size to packets of said second size;
   said processor also being operable to determine a most efficient bundling factor in terms of packet fragments, said most efficient bundling factor being determined by a largest packet per fragment ratio;
   wherein if a number of packets to be bundled is greater than the maximum bundling factor, packets are bundled according to the most efficient bundling factor for at least a next step in the transmission.

16. The apparatus of claim 15, wherein if a number of packets to be bundled is less than or equal to the maximum bundling factor then bundle all packets together for a next stop in the transmission.

17. The apparatus of claim 15, wherein said processor calculates a number of IP fragments for each bundling factor i through the maximum bundling factor.

18. The apparatus of claim 15, wherein said processor calculates a bundling efficiency for each bundling factor i through the maximum bundling factor.

19. The apparatus of claim 15, wherein a larger of multiple bundling factors having a same bundling efficiency is selected as the most efficient bundling factor.

20. The apparatus of claim 15, wherein said transmission is between a base station controller and a base station transmitter in a wireless network.

21. The apparatus of claim 15, wherein said transmission is in a voice over IP network involving packet multiplexing.

22. The apparatus of claim 15, wherein the maximum bundling factor, bmax, is determined according to $b_{max} = \lfloor (MTU_a - OH)/F \rfloor$, where $MTU_a$ is an IP packet MTU size at a first location, OH is protocol overhead and F is an application layer packet size.

* * * * *